US011180997B2

(12) United States Patent
Binek et al.

(10) Patent No.: US 11,180,997 B2
(45) Date of Patent: Nov. 23, 2021

(54) UNITIZED ROTOR ASSEMBLY

(71) Applicant: United Technologies Corporation, Farmington, CT (US)

(72) Inventors: Lawrence A. Binek, Glastonbury, CT (US); Jesus A. Garcia, San Diego, CA (US); Evan J. Butcher, Suffield, CT (US); Faramarz Zarandi, Vernon, CT (US); Matthew B. Kennedy, Vernon, CT (US); Jesse R. Boy, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 195 days.

(21) Appl. No.: 16/577,385

(22) Filed: Sep. 20, 2019

(65) Prior Publication Data
US 2021/0087935 A1    Mar. 25, 2021

(51) Int. Cl.
F01D 5/04 (2006.01)
B22F 3/15 (2006.01)
F02C 3/05 (2006.01)
B33Y 10/00 (2015.01)
B33Y 80/00 (2015.01)
F01D 5/34 (2006.01)
B22F 5/04 (2006.01)

(52) U.S. Cl.
CPC ............... *F01D 5/048* (2013.01); *B22F 3/15* (2013.01); *B22F 5/04* (2013.01); *F02C 3/05* (2013.01); *B22F 2301/15* (2013.01); *B33Y 10/00* (2014.12); *B33Y 80/00* (2014.12); *F05D 2230/31* (2013.01); *F05D 2300/175* (2013.01)

(58) Field of Classification Search
CPC ... F01D 5/048; F01D 5/34; F01D 5/02; F01D 5/081; F01D 5/087; B22F 3/15; B22F 5/04; B22F 5/009; B22F 12/00; B22F 2301/15; F02C 3/05; B33Y 10/00; B33Y 80/00; B33Y 70/00; F05D 2230/31; F05D 2300/175
See application file for complete search history.

(56) References Cited

U.S. PATENT DOCUMENTS

| 2,945,349 | A | 7/1960 | Ritzi |
| 6,866,478 | B2 | 3/2005 | Fabian et al. |
| 9,115,586 | B2* | 8/2015 | Jan .......................... F01D 5/04 |
| 2002/0012588 | A1 | 1/2002 | Matsunaga |

(Continued)

FOREIGN PATENT DOCUMENTS

| EP | 3415718 A2 | 12/2018 |
| WO | WO2004046522 A2 | 6/2004 |

OTHER PUBLICATIONS

Extended European Search Report for EP Application No. 20197018.3 dated Nov. 26, 2020, 9 pages.

*Primary Examiner* — J. Todd Newton
*Assistant Examiner* — Eric J Zamora Alvarez
(74) *Attorney, Agent, or Firm* — Kinney & Lange, P.A.

(57) ABSTRACT

A method of making a rotor assembly of a turbojet includes building the rotor assembly via layer-by-layer additive manufacturing. A turbine portion is formed and a compressor portion is integrally formed with the turbine portion. A shaft portion is integrally formed with the compressor portion. A material of the rotor assembly includes a nickel based alloy.

10 Claims, 2 Drawing Sheets

(56) References Cited

U.S. PATENT DOCUMENTS

| | | | |
|---|---|---|---|
| 2013/0294919 A1* | 11/2013 | Elfizy | B24B 27/0084 |
| | | | 416/223 R |
| 2015/0196971 A1 | 7/2015 | Schneider et al. | |
| 2017/0254209 A1* | 9/2017 | Smoke | F01D 5/187 |
| 2018/0045214 A1 | 2/2018 | McArdle et al. | |
| 2018/0112531 A1 | 4/2018 | Abrari | |
| 2018/0306114 A1* | 10/2018 | Dudebout | F01D 5/288 |

* cited by examiner

UNITIZED ROTOR ASSEMBLY

BACKGROUND

The present disclosure relates generally to rotor assemblies. In particular, the present disclosure relates to additively manufactured rotor assemblies.

Turbojets use turbomachinery to generate thrust to propel an air vehicle. Turbojets utilize a rotor assembly typically including a compressor, a shaft, and a turbine. The compressor ingests ambient air and compresses the air to be diffused and then directed to the combustor for mixing of the compressed air and fuel for ignition and combustion. The resulting hot gas is then directed to the turbine to create power and thrust.

Manufacturing of the turbojet rotor assembly often includes procuring raw material for the three major components in the form of raw stock, forgings, or castings. The procured raw material for each component is then separately heat treated, and machined to final detailed dimensions. Each component is separately inspected and balanced individually. Lastly, the components are brought together and assembled, and balanced again as a rotor assembly. In some instances, the rotor assembly can be pre-spun to verify the integrity of any cast components due to susceptibility to sub-surface defects.

SUMMARY

A method of making a rotor assembly of a turbojet includes building the rotor assembly via layer-by-layer additive manufacturing. A turbine portion is formed and a compressor portion is integrally formed with the turbine portion. A shaft portion is integrally formed with the compressor portion. A material of the rotor assembly includes a nickel based alloy.

A rotor assembly of a turbojet includes a turbine portion, a compressor portion, and a shaft portion. The compressor portion integrally formed with the turbine portion. The shaft portion is integrally formed with the compressor portion. A materials of the rotor assembly comprises a nickel based alloy.

The present summary is provided only by way of example, and not limitation. Other aspects of the present disclosure will be appreciated in view of the entirety of the present disclosure, including the entire text, claims, and accompanying figures.

Figure 1:
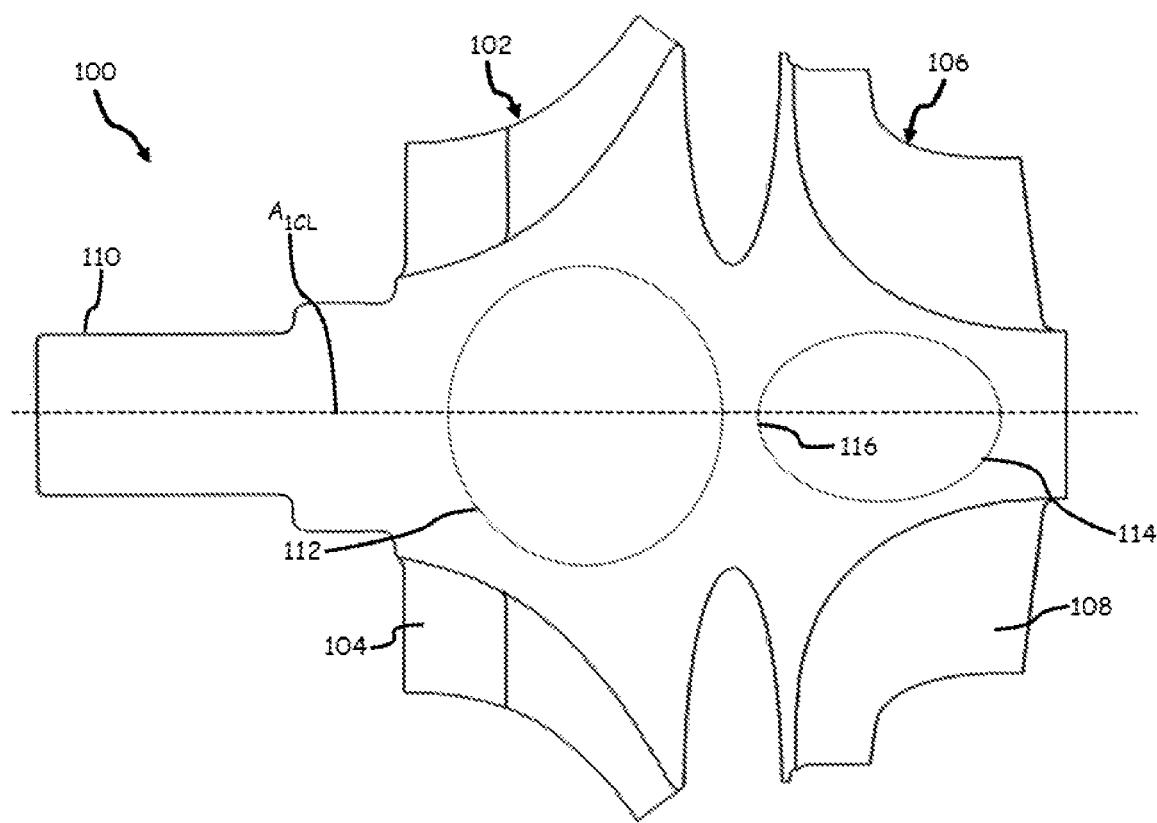
FIG. 1 is a cross-section view of a first rotor assembly.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

This disclosure presents an additively manufactured rotor assembly that results from integrating a compressor, turbine, and shaft into a single additively manufactured part requiring a minimum of material, heat treatment, machining, assembly, and balancing to complete the part. The additively manufactured rotor assembly, by virtue of eliminating the cast turbine wheel, will eliminate premature in-service failures from subsurface casting defects of the turbine wheel.

FIG. 1 is a cross-section view of first rotor assembly 100 and shows first compressor portion 102 (with first compressor blades 104), first turbine portion 106 (with first turbine blades 108), first shaft portion 110, first cavity 112, second cavity 114, first structural member 116, and first centerline axis $A_{1CL}$.

First rotor assembly 100 is a single additively manufactured part including first compressor portion 102, first turbine portion 106, and first shaft portion 110. In one example, first rotor assembly 100 is made from a laser beam melting or electron beam melting layer-by-layer additive manufacturing process. First rotor assembly 100 can be formed, at least in part, of a nickel based alloy capable of high strength at high operating temperatures (e.g., an age hardening austenitic (face-centred cubic) nickel-based superalloy) such as Inconel 718, Waspaloy, Haynes 282, Inconel 713, Inconel 738, Mar M 247, or Inconel 792.

First compressor portion 102 is a compressor rotor. In the illustrated embodiment, first compressor portion 102 is a radial compressor. First compressor blades 104 and first turbine blades 108 are airfoil blades. First turbine portion 106 is a turbine rotor. In this non-limiting embodiment, first turbine portion 106 is a radial turbine. First shaft portion 110 is a cylinder (with or without a hollow portion) of solid material. First cavity 112 and second cavity 114 are pockets or voids. In this example, first cavity 112 is approximately spherical and second cavity is approximately ellipsoidal. First structural member 116 is a piece or section of solid material disposed substantially in a plane transverse (e.g., orthogonal) to first centerline axis $A_{1CL}$ and situated between first cavity 112 and second cavity 114. First centerline axis $A_{1CL}$ is an imaginary axis about which first rotor assembly 100 rotates. First and second cavities 112 and 114 can be inter-connected to evacuate entrapped powder particles through another channel running through a hub of first compressor portion 102 or first turbine portion 106.

In one non-limiting embodiment, first rotor assembly 100 is part of a turbojet engine for an aircraft. In this example, first rotor assembly 100 is built via layer-by-layer additive manufacturing such that first compressor portion 102, first turbine portion 106, and first shaft portion 110 are integrally formed as a single, unitized piece of material. First compressor portion 102 is integrally formed with and connected to first turbine portion 106. First compressor blades 104 are disposed radially outward from first centerline axis $A_{1CL}$ along an outer radial perimeter of first compressor portion 102. First turbine portion 106 is integrally formed with and connected to both first compressor portion 102 and to first shaft portion 110. First turbine blades 108 are disposed radially outward from first centerline axis $A_{1CL}$ along an outer radial perimeter of first turbine portion 106.

First shaft portion 110 is integrally formed with and connected to first compressor portion 102. In this example, first cavity 112 is disposed inside of first compressor portion 102 and second cavity 114 is disposed inside of first turbine portion 106. First structural member 116 is disposed between first compressor portion 102 and first turbine portion 106. In this example, first compressor portion 102, first turbine portion 106, first shaft portion 110, first cavity 112, and second cavity 114 are disposed coaxially about first centerline axis $A_{1CL}$.

During operation of first rotor assembly 100, first compressor portion 102 ingests ambient air and compresses the air to be diffused and then directed to a combustor for mixing of the compressed air and fuel for ignition and combustion. The resulting hot gas is then directed to first turbine portion 106 to create power and thrust for the aircraft turbojet engine. First shaft portion 110 transfers torque to and from first rotor assembly 100 between other components of the aircraft turbojet engine. First cavity 112 and second cavity 114 provide for a reduction in mass and weight for first rotor assembly 100. First structural member 116 provides structural support to both first compressor portion 102 and to first turbine portion 106. In this example, first structural member 116 includes an average section stress less than a yield tensile strength of the material of first rotor assembly 100 at a maximum operating temperature.

Utilizing additive manufacturing to build first rotor assembly 100 instead of casting processes, eliminates premature in-service failures from turbine wheel subsurface casting defects that can occur with casting processes. The single material selected for the additive manufacturing of first rotor assembly 100 meets the strength and stiffness requirements of each of first compressor portion 102, first turbine portion 106, and first shaft portion 110. The nickel based alloy material of first rotor assembly 100 is strong enough to support first turbine portion 106, which typically experiences the greatest strain and highest temperatures as compared to first compressor portion 102 and first shaft portion 110. The creep rupture properties (ability to maintain high strength at high temperature) of the nickel based alloy material of first rotor assembly 100 (e.g., specifically for first turbine portion 106) extends the life of first rotor at service temperature and, hence, maximizes the operating turbine inlet temperature and therefore the specific power density required by first rotor assembly 100. The nickel based alloy material selected shall be conducive to additive manufacturing in regards to weldability, defect minimization, and dimensional stability and precision. A heat treatment can be applied to first rotor assembly 100. For example, a hot isostatic press process can be applied to first rotor assembly 100. Additionally, an abrasive flow machining process can be applied to first rotor assembly 100 in order to smooth a portion of a surface of first rotor assembly 100.

First rotor assembly 100 also costs less to manufacture than a non-additively manufactured rotor assembly due to additive manufacturing technology that reduces material processing, machining, scrap rate, and assembly compared to a typical multipart rotor assembly.

Figure 2:
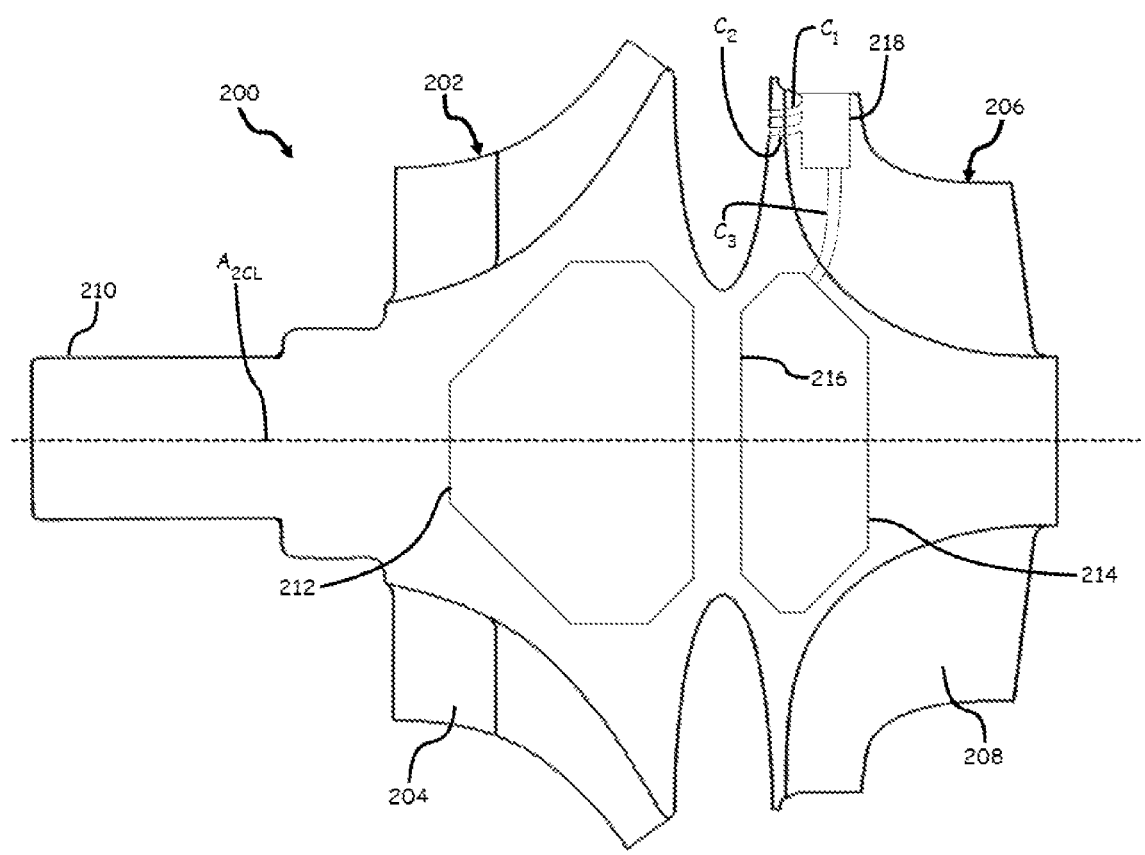
FIG. 2 is a cross-section view of a second rotor assembly.

FIG. 2 is a cross-section view of second rotor assembly 200 and shows second compressor portion 202 (with second compressor blades 204), second turbine portion 206 (with second turbine blades 208), second shaft portion 210, first cavity 212, second cavity 214, second structural member 216, slot 218, first channel $C_1$, second channel $C_2$, third channel $C_3$, and second centerline axis $A_{2CL}$.

The structure and operation of second rotor assembly 200 generally parallels first rotor assembly 100, discussed above. For example, regarding second rotor assembly 200 and its components, second rotor assembly 200 operates in the same or substantially the same manner as that of first rotor assembly 100 and its components discussed with respect to FIG. 1. Accordingly, the above description of first rotor assembly 100 and its components also extends to second rotor assembly 200 and its corollary components. As such, because the description of first rotor assembly 100 and its components can be used to describe second rotor assembly 200 and its components, a full description of second rotor assembly 200 is herein omitted in the interest of avoiding undue repetition.

In this example, first cavity 212 and second cavity 214 have a polygonal cross-section shape. In other embodiments, first cavity 212 and/or second cavity 214 can include any shape. Slot 218 is a cutout or aperture. First channel $C_1$, second channel $C_2$, and third channel $C_3$ are fluidic passages. In this example, a single slot 218 is disposed in and cut into a radially outer portion of one of second turbine blades 208. In other examples, more than one slot 218 can be disposed in second turbine blades 208 and/or in second compressor blades 204.

First channel $C_1$ and second channel $C_2$ are fluidly connected to and extend between an edge of slot 218 and an end-face of second turbine portion 206. Third channel $C_3$ is fluidly connected to and extends between second cavity 214 and slot 218. In other non-limiting embodiments, other channels can fluidly inter-connect any of first cavity 212, second cavity 214, and/or slot 218 by passing through any portions of second compressor portion 202, second turbine portion 206, second shaft portion 210, and second structural member 216.

In one non-limiting embodiment, a method of making second rotor assembly 200 includes building second rotor assembly 200 via a layer-by-layer additive manufacturing process. Second compressor portion 202 can be formed and second turbine portion 206 can be integrally formed with second compressor portion 202. Second shaft portion 210 can be integrally formed with second compressor portion 202. A material of second rotor assembly can include a nickel based alloy.

An internal cavity, such as first cavity 212, can be formed with second rotor assembly 200. The internal cavity can include a plurality of internal cavities. Second structural member 216 can be formed within second rotor assembly 200 and can be positioned between and separating two (e.g., first cavity 212 and second cavity 214) of the plurality of cavities apart from each other. Second structural member can be disposed between second compressor portion 202 and second turbine portion 206. One of first, second, and third channels $C_1$-$C_3$ can be formed in second rotor assembly 200.

Features can be formed on a surface of first channel $C_1$, the feature configured to change a behavior of a flow of fluid passing through first channel $C_1$. Hot isostatic pressing can be applied to second rotor assembly 200. A heat treatment can be applied to second rotor assembly 200. An abrasive flow machining process can be applied to second rotor assembly 200 in order to smooth a portion of a surface of second rotor assembly 200. The layer-by-layer additive manufacturing process can include laser beam melting or electron beam melting. The nickel based alloy material of second rotor assembly 200 can include Inconel 718, Waspaloy, Haynes 282, Inconel 713, Inconel 738, Mar M 247, or Inconel 792. After second rotor assembly 200 is built, second rotor assembly can be balanced via sacrificial material removal at a designated location on second rotor assembly such as on an end-face of one of second compressor portion 202 or second turbine portion 206.

The use of slot 218 and first through third channels $C_1$-$C_3$ provides the benefit of reducing turbine tip metal temperatures and allows for higher turbine inlet temperatures and therefore higher power density. Additionally, the reduced turbine tip metal temperatures from first through third channels $C_1$-$C_3$ expand the number of candidate alloys available, and thus more compatible alloys for making first and second rotor assemblies 100 and 200. Likewise, first through third channels $C_1$-$C_3$ can provide the benefit of avoiding distortion during the hot isostatic pressing application or to evacuate entrapped powder forming during the additive manufacturing build process.

Similar to first rotor assembly 100, the application of hot isostatic pressing provides the benefit of minimizing an internal porosity of second rotor assembly 200. Similar to first rotor assembly 100, the application of a heat treatment provides the benefit of strengthening the material of second rotor assembly 200. Similar to first rotor assembly 100, the application of abrasive flow machining enhances the aerodynamic performance and structural surface integrity of second rotor assembly 200.

Discussion of Possible Embodiments

The following are non-exclusive descriptions of possible embodiments of the present disclosure.

A method of making a rotor assembly of a turbojet includes building the rotor assembly via layer-by-layer additive manufacturing. A turbine portion is formed and a compressor portion is integrally formed with the turbine portion. A shaft portion is integrally formed with the compressor portion. A material of the rotor assembly includes a nickel based alloy.

The method of the preceding paragraph can optionally include, additionally and/or alternatively, any one or more of the following features, configurations, steps and/or additional components.

An internal cavity can be formed within the rotor assembly.

The internal cavity can comprise a plurality of internal cavities, and/or further comprising forming a structural member within the rotor assembly, wherein the structural member can be positioned between and/or separate two of the plurality of internal cavities apart from each other.

The structural member can be disposed between the turbine portion and the compressor portion.

A cooling passage can be formed in the rotor assembly.

A feature can be formed on a surface of a first cooling passage, wherein the feature can change a behavior of a flow of fluid passing through the first cooling passage.

A heat treatment can be applied to the rotor assembly.

The rotor assembly can be hot isostatic pressed.

An abrasive flow machining process can be applied to the rotor assembly to smooth a portion of a surface of the rotor assembly.

The layer-by-layer additive manufacturing can comprise laser beam melting or electron beam melting.

The nickel based alloy material can comprise Inconel 718, Waspaloy, Haynes 282, Inconel 713, Inconel 738, Mar M 247, or Inconel 792.

A rotor assembly of a turbojet includes a turbine portion, a compressor portion, and a shaft portion. The compressor portion integrally formed with the turbine portion. The shaft portion is integrally formed with the compressor portion. A materials of the rotor assembly comprises a nickel based alloy.

The rotor assembly of the preceding paragraph can optionally include, additionally and/or alternatively, any one or more of the following features, configurations and/or additional components.

An internal cavity can be within the rotor assembly.

The internal cavity can comprise a plurality of internal cavities, and/or further comprising forming a structural member within the rotor assembly, wherein the structural member can be positioned between and/or separate two of the plurality of internal cavities apart from each other.

The structural member can be disposed between the turbine portion and the compressor portion.

A cooling passage can be disposed in the rotor assembly.

A feature can be on a surface of a first cooling passage, wherein the feature can change a behavior of a flow of fluid passing through the first cooling passage.

The nickel based alloy material can comprise Inconel 718, Haynes 282, Inconel 713, Inconel 738, Mar M 247, or Inconel 792.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a rotor assembly of a turbojet, the method comprising:
   building, via layer-by-layer additive manufacturing, the rotor assembly, wherein building the rotor assembly comprises:
   forming a turbine portion;
   forming a compressor portion integrally with the turbine portion;
   forming a shaft portion integrally with the compressor portion, wherein a material of the rotor assembly comprises a nickel based alloy;
   forming a plurality of internal cavities within the rotor assembly; and
   forming a structural member within the rotor assembly, wherein the structural member is positioned between and separates two of the plurality of internal cavities apart from each other and the structural member is disposed between the turbine portion and the compressor portion.

2. The method of claim 1, further comprising forming a cooling passage in the rotor assembly.

3. The method of claim 1, further comprising applying a heat treatment to the rotor assembly.

4. The method of claim 3, further comprising hot isostatic pressing the rotor assembly.

5. The method of claim 1, further comprising smoothing a portion of a surface of the rotor assembly.

6. The method of claim 1, wherein the layer-by-layer additive manufacturing comprises laser beam melting or electron beam melting.

7. The method of claim 1, wherein the nickel based alloy material comprises Inconel 718, Waspaloy, Haynes 282, Inconel 713, Inconel 738, Mar M 247, or Inconel 792.

8. A rotor assembly of a turbojet, the rotor assembly comprising:
   a turbine portion;
   a compressor portion integrally formed with the turbine portion;
   a shaft portion integrally formed with the compressor portion, wherein a material of the rotor assembly comprises a nickel based alloy;
   a plurality of internal cavities within the rotor assembly; and
   a structural member within the rotor assembly, wherein the structural member is positioned between and separates two of the plurality of internal cavities apart from each other and the structural member is disposed between the turbine portion and the compressor portion.

9. The rotor assembly of claim 8, further comprising a cooling passage in the rotor assembly.

10. The rotor assembly of claim 8, wherein the nickel based alloy material comprises Inconel 718, Haynes 282, Inconel 713, Inconel 738, Mar M 247, or Inconel 792.

* * * * *